United States Patent [19]
Ross

[11] Patent Number: 4,703,489
[45] Date of Patent: Oct. 27, 1987

[54] WAVEGUIDE LASER

[75] Inventor: Iain E. Ross, Newport-on-Tay, Scotland

[73] Assignee: Ferranti, plc, Gatley, Cheadle, England

[21] Appl. No.: 701,158

[22] Filed: Feb. 13, 1985

[30] Foreign Application Priority Data

Feb. 18, 1984 [GB] United Kingdom ............... 8404310

[51] Int. Cl.⁴ ............................................. H01S 3/03
[52] U.S. Cl. ........................................ 372/64; 372/35; 372/87; 372/97; 372/82; 372/83; 372/92
[58] Field of Search ................... 372/64, 83, 55, 87, 372/92, 34, 35, 82, 38, 97

[56] References Cited

U.S. PATENT DOCUMENTS

| | | | |
|---|---|---|---|
| 3,815,047 | 6/1974 | Smith et al. | 372/64 |
| 4,169,251 | 9/1979 | Laakmann | 372/64 |
| 4,472,808 | 9/1984 | Suzuki | 372/64 |
| 4,493,087 | 1/1985 | Laakmann et al. | 372/64 |
| 4,494,236 | 1/1985 | Sutter | 372/64 |

FOREIGN PATENT DOCUMENTS 0003280 8/1979 European Pat. Off. .
1452156 10/1976 United Kingdom .

*Primary Examiner*—Leon Scott, Jr.
*Attorney, Agent, or Firm*—Dennis P. Clarke

[57] ABSTRACT

A transversely-excited waveguide laser made up from the two blocks of electrically-insulating material. One block (1) has three parallel slots (3, 4 and 5) formed in one face, while the other block (2) forms a cover which may be secured to the first block to close the slots. The two outermost slots (4 and 5) each contain a layer (7) of electrically-conductive material to which an electrical conductor (8) is attached to form an electrode, while the dimensions of the center slot (3) are such as to enable it to form a laser cavity which will support waveguide laser action.

18 Claims, 9 Drawing Figures

WAVEGUIDE LASER

This invention relates to waveguide lasers, and in particular to the construction of a transverse-excited waveguide laser.

Waveguide lasers are known in which laser action takes place in a cavity whose dimensions are small and related to the characteristics of the radiation produced. Frequently the cavity is of rectangular cross-section. Laser action is produced by an electric discharge in the gas filling the waveguide. It has been common for the discharge to extend along the length of the waveguide between electrodes at opposite ends of the waveguide. More recently, transverse excitation of the gas has been used, by placing the electrodes on opposite sides of the cavity. This places the electrodes much closer together and makes it easier to initiate the discharge, the transverse excitation also makes it possible to use higher pressures in the gas, which results in additional advantages.

British Pat. No. 1,452,156 relates to a transversely-excited waveguide laser in which the cavity is formed by two opposing blocks of a metal such as copper, separated by two blocks of insulating material such as beryllia or fused quartz. The laser described in that specification is excited by pulses at a repetition rate of 100 Hz, though other sources describe a laser of similar construction being excited by pulses at a repetition rate of 40 KHz.

European Pat. No. 3,280 relates to a transversely-excited waveguide laser of similar construction. In order to overcome problems caused by pulse excitation, alternating current excitation is used. However, to avoid interaction between the excitation forming two opposing walls of the waveguide and the discharge electrons, it is necessary to chose an excitation frequency related to the dimensions of the waveguide such that the above-mentioned interaction cannot occur. This places severe limitations on the excitation frequency which are sometimes undesirable. In addition, the presence of the metal electrodes inside the cavity may cause chemical degradation of the gaseous active medium.

It is an object of the invention to provide a transversely-excited waveguide laser of simple construction which avoids the above-mentioned disadvantages.

According to the present invention there is provided a transversely-excited waveguide laser which includes a first block of electrically-insulating material in one face of which are formed three parallel elongated slots, a layer of electrically-conducting material covering at least one face of each of the two slots to form an electrode, an electrical conductor connected to each of said conducting layers, and a second block of electrically insulating material attached to said first block so as to close at least the centre one of the slots formed therein, the centre slot when so closed having dimensions which enable it to form a laser cavity which will support waveguide laser action.

The invention will now be described with reference to the accompanying drawings in which.

Figure 1:
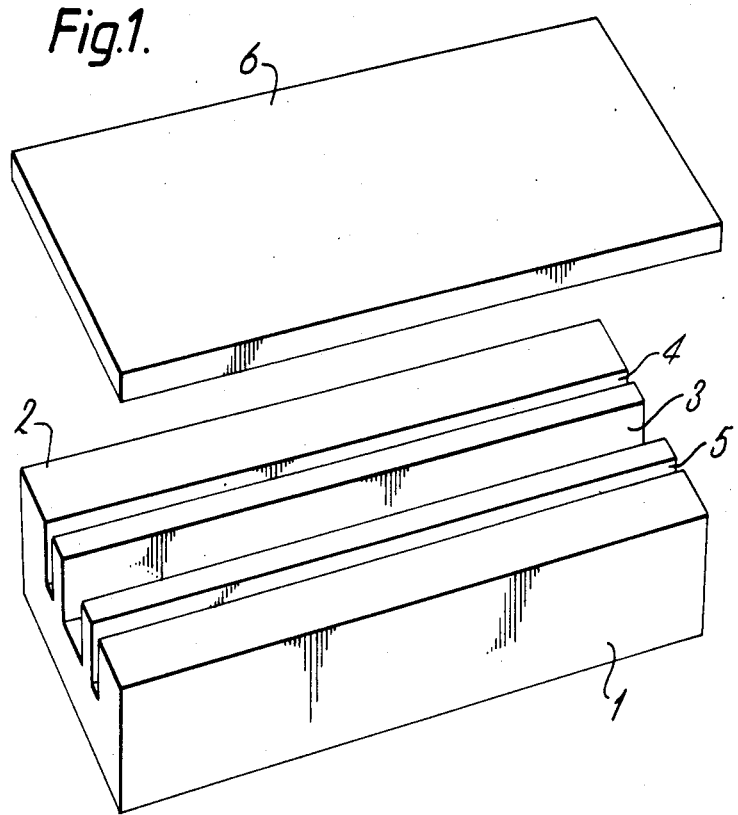
FIG. 1 is an isometric exploded view of the first and second blocks of the laser according to a first embodiment of the invention.

Referring now to FIG. 1, the transversely-excited waveguide laser is built up around two blocks of a suitable insulating material such as alumina ($Al_2O_3$) or beryllia (BeO). The first block 1 is preferably of rectangular section as shown, the length of the block being determined by the characteristics of the laser itself. In one flat surface 2 are formed three slots 3, 4 and 5. The centre slot 3 is the actual waveguide in which lasing occurs, and the cross-sectional shape and dimensions are again determined by the characteristics of the laser. Purely by way of example a square-section slot of 2 mm sides may be used for lasing at 10.6 microns. One each side of the centre slot 3 is formed a further slot 4 and 5, these being parallel to the centre slot 3 and close to it. The slots 4 and 5 will usually, though not necessarily, be of the same depth as the centre slot 3, but may be narrower, and may be of any suitable shape.

The second block 6 is a cover which is placed over the face 2 of the block into which the slots 3, 4 and 5 are formed. The face 2 and one surface of the cover are of the same profile, preferably flat, so that the cover 6 may be secured to the block 1 so as to close the three slots in the block 1.

Figure 2:
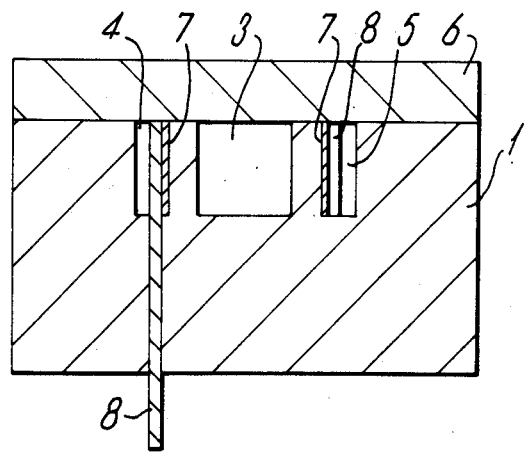
FIG. 2 is a cross-sectional view of a laser according to the first embodiment.

FIG. 2 is a cross-sectional view of the block 2 and cover 6 secured together. Slots 4 and 5 contain thin metallic layers 7, formed over at least that surface of the slots closest to the centre slot 3. The metallic layers may be of copper, formed by electroless deposition, in which case they will probably cover the sides and bottom of the slots, being formed before the cover 6 is put into place. An electrical connection is made to each of the conducting layers 7, preferably by a post 8 inserted through a hole in the block 1 and attached to the metallic layer 7. The electrical connections may be made in other ways.

Figure 3:
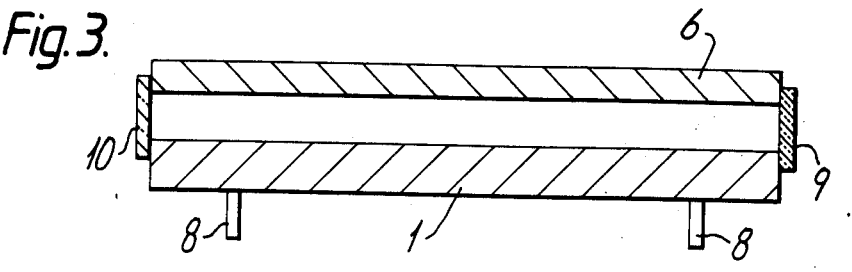
FIG. 3 is a longitudinal sectional view of the laser of FIG. 2.
Figure 4:
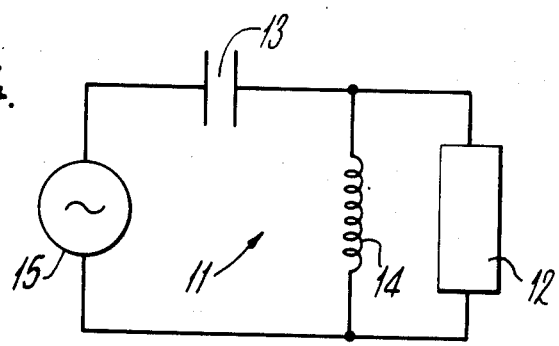
FIG. 4 shows a schematic circuit diagram.

The assembly as described above forms a laser apart from the provision of a low-pressure gas filling in the centre slot 3 and the necessary optical elements define the optical cavity of the laser. FIG. 3 is a longitudinal section of one possible construction of the complete laser. A pair of mirrors 9 and 10 are secured to the assembled block 1 and cover 6 so as to seal the centre slot 3. One mirror is totally reflecting whilst the other is slightly transmissive to provide an output beam from the laser. Before or after the mirrors are sealed into place the necessary gas is introduced into the centre slot 3, which is the waveguide lasing cavity. The gas may be a $CO_2$, Ne, He mixture. The laser is conveniently excited by an alternating voltage of, say, between 500 and 1000 volts at a frequency of the order of 80 MHz, the voltage being applied to the two posts 8. In practice a wide range of excitation frequencies may be used. FIG. 4 shows one possible circuit arrangement for energising the laser. An rf generator 15 generates a voltage at the necessary energising frequency and is connected by way of a suitable matching network 11 to the electrodes of the laser 12. The matching network shown comprises a series capacitor 13, which may be variable, and a shunt inductor 14. The resulting transverse field in the gas produces an rf discharge which produces the laser action. Since the electrodes which produce the gas discharge are insulated from the discharge in the centre slot by the intervening walls of insulating material, it is not possible for discharge ions or electrons to strike the conducting layers 7. This avoids the problems which are associated with lasers in which the electrodes are exposed to the discharge. In particular the two ceramic walls between the electrodes 7 and the gas discharge act as ballast capacitors, and result in an even and stable discharge in the gas.

Other matching circuits may be used.

Figure 5:
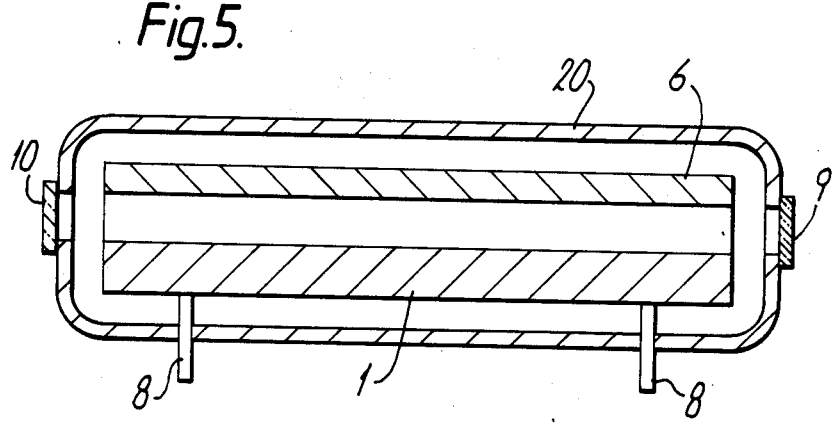
FIG. 5 is a longitudinal sectional view of a laser according to a second embodiment.

The assembly shown in FIG. 3 clearly has some disadvantages. The main one is that the mirrors 9 and 10 cannot be adjusted since they also act to seal the laser cavity which contains gas at a pressure below atmospheric pressure. FIG. 5 illustrates schematically an alternative arrangement using the same assembly of block 1 and cover 6. In this embodiment a pressure vessel 20 encloses the laser assembly, which is rigidly supported within it. The mirrors 9 and 10 are mounted on the pressure vessel 20 and may be mounted so that adjustment is possible. The lasing gas or gas mixture is introduced into the enclosure 20 and hence fills the three slots in the block assembly. The electrical connections 8 are brought out through the wall of the pressure vessel 20 and laser action may take place as before. The practical arrangements of supporting the block assembly inside the pressure vessel are not shown.

Figure 6:
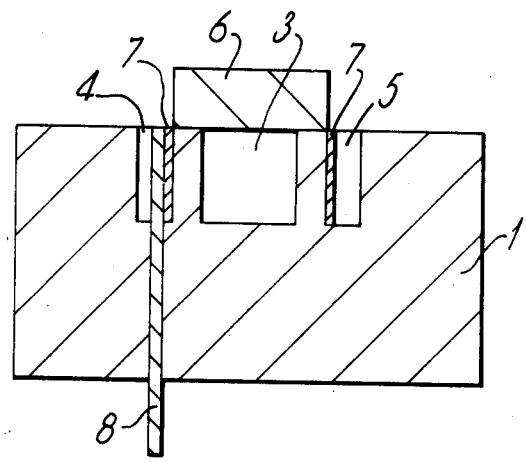
FIG. 6 is a cross-sectional view of an alternative form of laser.

Various modifications are possible to the block assembly of FIGS. 1 and 2. Since it is only the centre slot 3 which requires an accurately-dimensioned fourth surface, the cover 6 may be narrower than the block 1 so as to cover only the centre slot 3, leaving slots 4 and 5 open. This is illustrated in FIG. 6. This is dependent upon the ability to obtain adequate attachment of the cover to the block.

Figure 7:
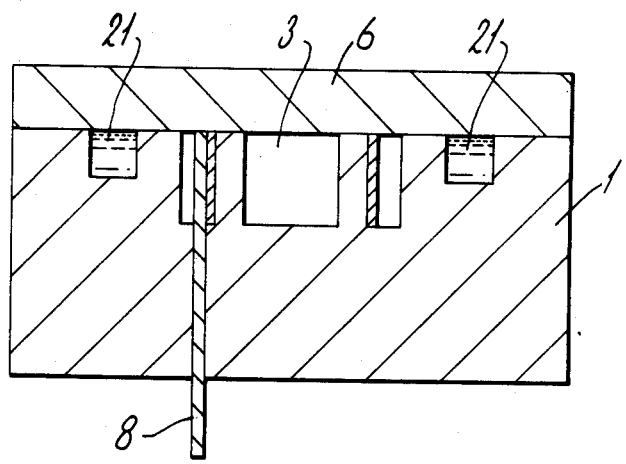
FIG. 7 is a cross-sectional view of a third form of laser.

Lasers of all types generate considerable amount of heat. For example a laser with a 10 watt output may dissipate 100 watts of heat, and it may be necessary to remove this from the laser. FIG. 7 shows how this may be done by forming outer slots 21 in the block 1 which are closed by the cover 6. These outer slots may be used for the circulation of a fluid coolant for removing unwanted heat from the assembly.

Figure 8:
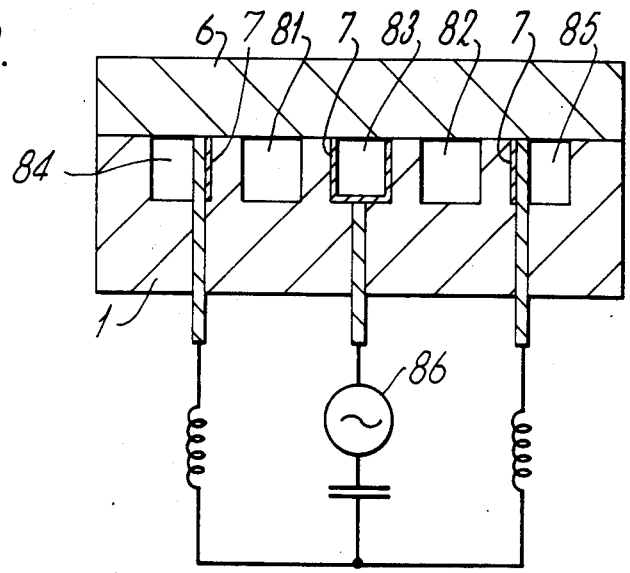
FIGS. 8 and 9 illustrate further forms of laser.
Figure 9:
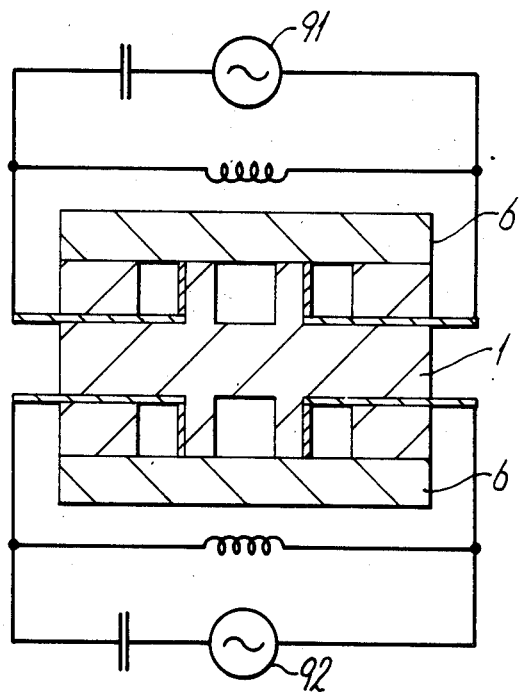

The simple laser construction described above lends itself to other alternative arrangements. Multi-bore lasers may be divided, either to produce two separate output beams or for folded lasers. FIGS. 8 and 9 illustrate two such arrangements formed from a single block of ceramic material. Referring now to FIG. 8, the block 1 has five slots formed in it, two of which, 81 and 82 form two waveguide laser cavities. The centre slot 83 has a metallic layer 7 formed on both sides to form an electrode common to each laser. The outer slots 84 and 85 each carry a metallic layer 7 on at least one side to form the second electrode of each laser. Apart from the common centre electrode the two waveguides may be considered as separate lasers, and may be energised either in parallel from the same generator 86 or from separate generators. The cover 6 is provided as before.

FIG. 9 shows an alternative multiple-bore arrangement in which two sets of three slots are formed in opposite surfaces of the block 1. The completely separate sets of electrodes and separate covers are provided. Again, each laser may be energised from the same generator or separate generator 91 and 92 may be provided, possibly operating at different frequencies.

Clearly the block 1 and cover 6 need not be of rectangular cross-section, though this is probably the most economical shape to produce in the insulating materials suitable for the purpose. The required slots may be moulded into the block when it is formed, or may be machined subsequently.

What we claim is:

1. A transversely-excited waveguide laser which includes a first block of electrically-insulating material in one face of which are formed three parallel elongated slots, a layer of electrically-conducting material covering at least one face of each of the two outer slots to form an electrode, an electrical conductor connected to each of said conducting layers, and a second block of electrically-insulating material attached to said first block so as to close at least the centre one of the slots formed therein, the centre slot when so closed having dimensions which enable it to form a laser cavity which will support waveguide laser action.

2. A laser as claimed in claim 1 in which each of the three slots is of rectangular cross-section.

3. A laser as claimed in claim 1 in which each layer of electrically conducting material is formed by electroless deposition.

4. A laser as claimed in claim 1 in which the second block of electrically-insulating material covers substantially the entire surface of the first block in which the slots are formed.

5. A laser as claimed in claim 1 in which the second block of electrically-insulating material covers only the centre slot.

6. A laser as claimed in claim 1 in which the first and second blocks have a mirror secured to each end to seal at least the centre slot.

7. A laser as claimed in claim 6 in which a gaseous active medium is contained in said laser cavity.

8. A laser as claimed in claim 1 in which the first and second blocks are located in a sealed enclosure carrying a pair of mirrors.

9. A laser as claimed in claim 1 in which a gaseous active medium is contained in said enclosure.

10. A laser as claimed in claim 1 in which further slots are formed in said first block for the circulation of a cooling fluid.

11. A laser as claimed in claim 1 in which the gaseous active medium is a mixture of carbon dioxide, helium and nitrogen.

12. A laser as claimed in claim 1 which includes an energising circuit comprising an rf generator and a matching circuit connecting the output of the generator to the two electrodes of the laser.

13. A laser as claimed in claim 11 in which the electrically-insulating material between each electrode and the laser cavity forms a ballast capacitor.

14. A laser is claimed in claim 1 in which said first block has formed in it two sets of slots whereby two separate waveguide laser cavities are provided.

15. A laser as claimed in claim 14 in which one of said two sets of slots contains an electrode which is common to both laser cavities.

16. A laser as claimed in claim 14 which includes an energising circuit comprising single rf generator connected through a matching circuit to both sets of electrodes.

17. A laser as claimed in claim 14 in which includes two rf generators each connected through a matching circuit to a separate one of the sets of electrodes.

18. A laser as claimed in claim 1 in which the laser is excited by the application of an alternating voltage at a frequency of the order of 80 MHz to said electrodes.

* * * * *